Patented May 29, 1923.

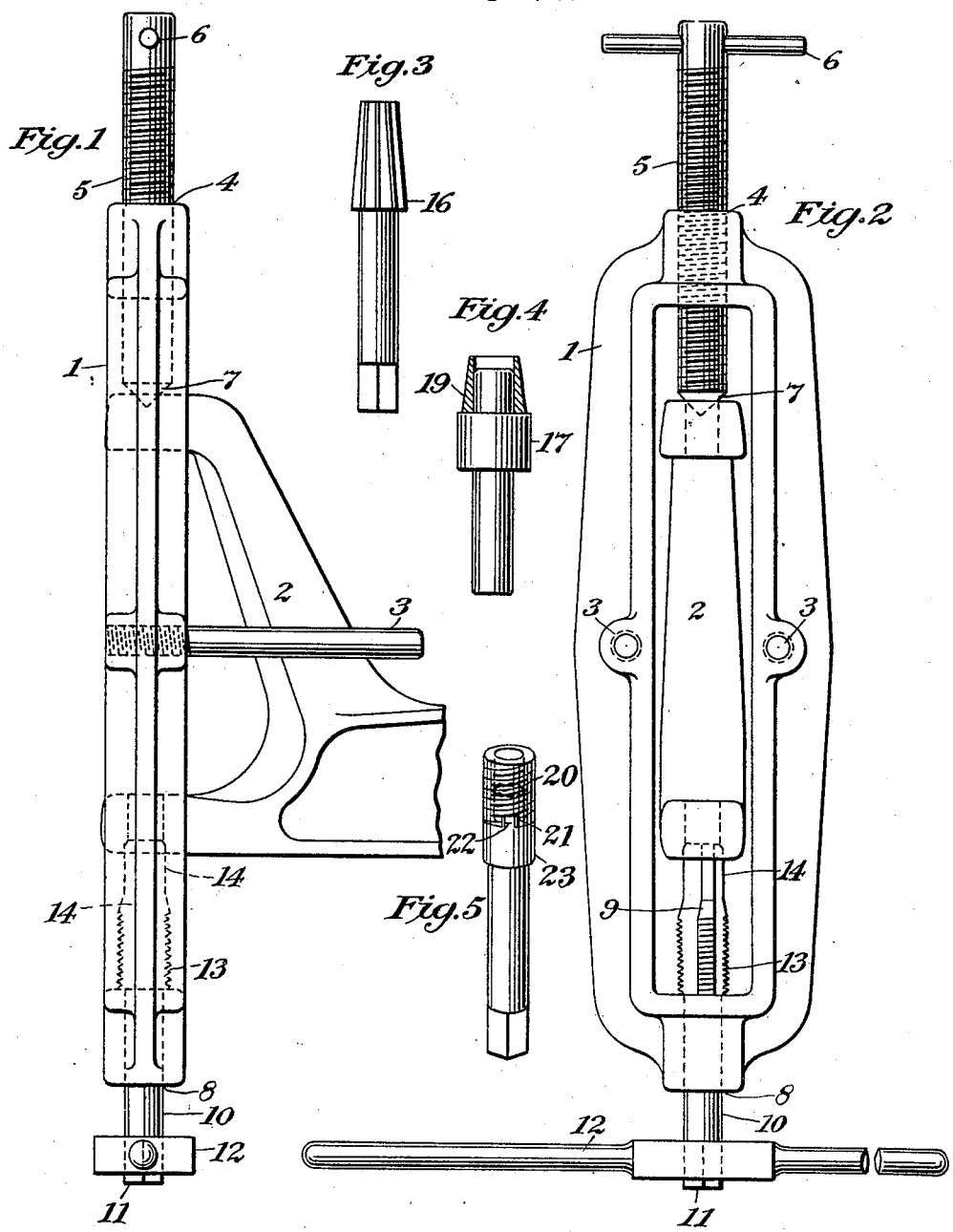

1,457,119

UNITED STATES PATENT OFFICE.

JOHN J. McGUCKIN, OF BROOKLYN, NEW YORK.

AXLE-BEARING-REPAIRING TOOL.

Application filed August 5, 1921. Serial No. 490,041.

*To all whom it may concern:*

Be it known that I, JOHN J. MCGUCKIN, a citizen of the United States, residing at Brooklyn, Kings County, New York, have invented certain new and useful Improvements in Axle-Bearing-Repairing Tools, of which the following is a specification.

My invention relates to a tool which is designed particularly for repairing the bearings on the ends of the front axles of automobiles of what may be called the Ford type.

Such axles are provided at each end with a pair of arms or lugs, between which is secured the arm carrying the front wheel, a bolt being passed down through the axle lugs and through cooperating lugs on the wheel arm, so that the latter is pivoted to the axle and may be swung back and forth by means of steering mechanism, so as to give the desired direction to the front wheel.

The bolt, which acts as a pivot in connecting the wheel arm and the axle, is customarily threaded through the lower axle lug and then locked in place by a lock nut, and a cotter pin is passed through the bolt.

It is found, in practice, that this bolt, in time, becomes loose in its bearings, the thread in the lug becomes worn or mutilated and the hole through the upper lug becomes worn so that the bolt will have more or less play, this play in turn tending to aggravate the situation and gradually enlarge the hole in the upper lug. It then becomes necessary to drill out the lugs and insert bushings in them which will be of a suitable size to receive a new bolt to properly carry the wheel arm.

It is the object of my present invention to produce a tool which will facilitate the necessary reaming and threading operations involved in making this repair, and which may also be used for inserting the new bushings in their proper positions.

In the drawings, Fig. 1 is a side view of my tool, showing it applied to the end of an axle; Fig. 2 is a front elevation of the same; and Fig. 3 is a view of a special form of reamer; and Figs. 4 and 5 are views of supplementary tool elements.

Similar parts are designated by similar reference numerals in all the figures.

The frame 1 is made of a size suitable to slip over the lugs on the end of the axle 2; and is provided with steadying rods 3, 3, which are threaded into the sides of the frame, and are adapted to extend out along, and near to the shoulders of the axle, so that the frame can have but a slight rotary movement relative to the axle. One end of the frame has a threaded hole 4, passing down through it, in which is mounted a screw 5, provided with suitable handle 6, whereby it may be turned up and down. This screw is, preferably, of larger diameter than the bolt hole through the axle lugs, and it is provided with a conical end 7, which permits the bolt to be centered in the hole in the upper lug without passing through it. The other end of the frame 1 is provided with a smoothly bored hole 8, of a smaller diameter than the hole through the axle lugs; this hole 8 being adapted to register below the hole in the lower lug when the screw 4 registers with the hole in the upper lug.

A reamer and tap 9, is provided with a reduced shank 10, having an angular extremity 11, adapted to receive a suitable wrench or turning tool 12.

The shank 10 of this reamer and tap may be passed down from inside the frame 1, through the hole 8, till the shoulder at the base of the tap 13 reaches the inside of the frame 1.

It will be seen, therefore, that if the reamer and tap 9, is placed in the position just described, in the frame 1, and then the tool is adjusted over the axle lugs so that the reamer 14 is entered in the hole through the lower lug, while the end 7, of the screw 4, is entered in the hole through the upper lug, that then if the screw 4 is turned down through the frame 1, the reamer portion of the tool 9, will be forced up into the hole through the lower lug. The reamer may then be turned gradually to enlarge the hole, being kept to duty by gradually screwing down the screw 4, and when the reaming blades have properly enlarged the hole a new thread may be cut in it by continuing the operation with the tap 13. This will result in making a new bore through the lower lug and threading it to properly receive a threaded bushing of appropriate size.

The screw 4 may then be reversed so as to free the frame and allow it to be removed from the end of the axle. A reamer 16 may then be inserted in place of 9, and the position of the frame relative to the axle reversed so that the reamer may enter the hole in the upper lug and the screw 4 center in the hole through the lower lug; after which the upper hole may be reamed out in conical form by rotating the reamer, at the same time screwing up the screw 4.

This will produce a new conical seat in the upper lug.

The tool may be used to insert the bushings by substituting a suitably headed tool 17 for the reamer 16, the head of such substitute tool being too large to pass down through the hole in the new, conical bushing 19. The bushing is then dropped loosely into position in the lug and may be forced home positively and securely by drawing the headed element down against it by aid of the screw 4.

The lower bushing 20, threaded externally and internally, may be screwed in place in the lower lug, by providing it with a suitable cross slot 21 to cooperate with an engaging element 22 upon the end of a driver 23, which may be substituted for the reamer 9 or 16 in the smooth bearing of the frame 1. If, then the bushing is started into the newly threaded bore through the lug, it may be screwed home by turning the engaging element, which may be kept to duty by gradually turning down the screw 4 as the bushing is sent home, and this avoids slipping of the engaging element and marring of the bushing in the process of inserting it.

It is obvious that details of my improved tool might be modified as by the substitution of mechanical equivalents or the like without departing from the spirit of my invention as claimed.

Having thus described my invention, what I claim and desire to secure by Letters Patent of the United States, is:—

1. An axle bearing repairing tool, embodying a centrally slotted frame adapted to straddle the axle lugs, a feeding and centering screw threaded through one end of said frame, said screw having a larger diameter than the axle pin, and provided with a centering end, and a machining tool rotatively mounted in the other end of the frame, the end of the feed screw and the free end of the tool being adapted to enter the opposite ends of the axle-pin socket, and to center the tool in operative relation thereto.

2. An axle bearing repairing tool embodying a centrally slotted frame adapted to straddle the axle lugs, a feeding and centering screw threaded through one end of said frame, said screw having a larger diameter than the axle pin, and provided with a centering end, and a machining tool rotatively mounted in the other end of the frame and embodying reaming and threading elements, the end of the feed screw and the free end of the tool being adapted to enter the opposite ends of the axle-pin socket and to center the tool in operative relation thereto.

3. An axle bearing repairing tool, embodying a centrally slotted frame adapted to straddle the axle lugs, and provided with laterally extended anti-rotating means, a feed screw of a larger diameter than the axle pin, threaded through one end of the frame, and a machining tool, provided with a reduced shank mounted for rotation in a smooth bearing in the other end of the frame.

4. An axle bearing repairing tool, embodying a centrally slotted frame adapted to straddle the axle lugs, provided with pins constituting laterally extended anti-rotating means, a feed screw of a larger diameter than the axle pin, threaded through one end of the frame, and a machining tool, provided with a reduced shank mounted for rotation in a smooth bearing in the other end of the frame.

JOHN J. McGUCKIN.